(12) United States Patent
Niederer et al.

(10) Patent No.: US 12,391,830 B2
(45) Date of Patent: Aug. 19, 2025

(54) LIQUIDS FOR TUNABLE OPTICAL DEVICES

(71) Applicant: Optotune AG, Dietikon (CH)

(72) Inventors: David Andreas Niederer, Küttigen (CH); Andreas Brändle, Zürich (CH); Marta Vidiella del Blanco, Dietikon (CH)

(73) Assignee: Optotune AG, Dietikon (CH)

( * ) Notice: Subject to any disclaimer, the term of this patent is extended or adjusted under 35 U.S.C. 154(b) by 619 days.

(21) Appl. No.: 17/680,351

(22) Filed: Feb. 25, 2022

(65) Prior Publication Data
US 2022/0289978 A1  Sep. 15, 2022

(30) Foreign Application Priority Data

Feb. 25, 2021  (DE) .............. 10 2021 104 571.1

(51) Int. Cl.
*G02B 3/14* (2006.01)
*C08L 83/04* (2006.01)
*C08L 83/08* (2006.01)

(52) U.S. Cl.
CPC .............. *C08L 83/04* (2013.01); *C08L 83/08* (2013.01); *G02B 3/14* (2013.01)

(58) Field of Classification Search
CPC . G02B 3/12; G02B 3/14; G02B 1/041; G02B 3/06; G02B 7/023; G02B 26/004;
(Continued)

(56) References Cited

U.S. PATENT DOCUMENTS 7,256,943 B1 * 8/2007 Kobrin .................. G02B 3/14
359/666
2005/0070626 A1  3/2005 Lowery

FOREIGN PATENT DOCUMENTS

| CN | 110446474 | 11/2019 |
|---|---|---|
| JP | 10087992 | 4/1998 |

(Continued)

OTHER PUBLICATIONS

Liang Dan et al. "Bionic intraocular lens with variable focus and integrated structure" Optical Engineering Soc. of Photo-Optical Instrumentation Engineers Bellingham, 54(10) (Oct. 1, 2015).

*Primary Examiner* — Jie Lei
(74) *Attorney, Agent, or Firm* — JMB Davis Ben-David

(57) ABSTRACT

The present invention relates to an optical tuneable device comprising a volume and a polydimethylsiloxane (PDMS) membrane, wherein the membrane delimits the volume at least partially and the volume is filled with a silicone-based polymer of formula 1,

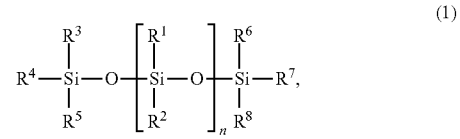

with $R^1$ being an alkyl moiety, $-(CH_2)$-phenyl, phenyl, $CF_3$ or alkyl-CN moiety, $R^2$ to $R^8$ being $-H$, an alkyl, $(CH_2)$-phenyl or phenyl moiety. The polymer may optionally be substituted by $-F$. Furthermore, the present invention relates to the use of said polymer in an optical tuneable device.

17 Claims, 2 Drawing Sheets

(58) Field of Classification Search
CPC ........ G02B 26/005; G02C 7/08; G02C 7/083;
G02C 7/085; G02C 7/101; G02C
2202/22; A61B 3/0285; A61B 3/036;
A61B 3/04; A61B 3/028; A61B 3/08;
C08L 83/04; C08L 83/08
USPC ............... 359/665–667, 557, 694, 808, 813,
359/822–824; 351/159.01, 159.34,
351/159.68, 159.73
See application file for complete search history.

(56) References Cited

FOREIGN PATENT DOCUMENTS

| | | |
|---|---|---|
| JP | 2001220142 | 8/2001 |
| JP | 2011500957 | 1/2011 |
| JP | 2016024464 | 2/2016 |
| JP | 2017062488 | 3/2017 |
| JP | 2017 522120 | 8/2017 |
| JP | 2020014856 | 1/2020 |
| WO | 2018/119408 | 6/2018 |
| WO | 2020002339 | 1/2020 |

* cited by examiner

LIQUIDS FOR TUNABLE OPTICAL DEVICES

CROSS-REFERENCE TO RELATED APPLICATIONS

Benefit is claimed to German Patent Application No. DE 10 2021 104 571.1, filed Feb. 25, 2021, the contents of which are incorporated by reference herein in their entirety.

FIELD

The present invention relates to an optical tuneable device comprising a volume and a membrane, wherein the membrane delimits the volume at least partially and the volume is filled with a siloxane-based polymer. Furthermore, the present invention relates to the use of said polymer in an optical tuneable device.

BACKGROUND OF THE INVENTION

An optical device, such as a tuneable lens, typically comprises a transparent and elastically expandable membrane, an optical element opposing (facing) the membrane and a wall connecting the optical element to the membrane. The membrane, the optical element, and the wall delimit a volume of the lens, which is filled with a liquid.

The focus of the lens can be adjusted by changing the curvature of the membrane. This may for instance be achieved by using an actuator that presses a holding ring against the membrane so as to deform an optically active part of the membrane (US2010202054).

Also known are lens assemblies in which a force is directly exerted on the membrane e.g., by means of a coil (WO2010104904) or by means of a ring-shaped piston that directly indents the membrane in order to deform it (US2011267703).

Alternatively, the optical behavior of the membrane can be changed by using a wall that is designed to be adjustable in height with respect to the optical element. By amending the height of the wall, the pressure of the fluid residing inside the volume and therewith a curvature of the membrane, and/or the spatial position of the membrane with respect to the optical element is adjusted.

WO 2018/119408 A1 discloses an accommodating intraocular lens for implantation within a capsular bag of a patient's eye. The lens comprises an inner fluid chamber and an outer fluid reservoir filled with a siloxane-based liquid. The fillable volume is delimited by a polymeric material such as poly(methylmethacrylate) (PMMA) copolymer. Water within the lens capsule of the subject may transfer into or out of the inner fluid chambers or the outer fluid reservoir through the polymeric material to achieve an osmotic equilibrium.

Further examples for siloxane-based lens oils suitable for intraocular lens devices are disclosed in WO 2017/205811. A mixture of dimethylsiloxane and diphenylsiloxane having less than about 4 wt. % of any component with a molecular weight less than about 15,000 Daltons was found to result in no swelling of the bulk polymer material when in contact therewith. The bulk polymer material may be composed of a silicone, an acrylic, a plastic or polymeric hydrogel.

Based on the chemical structure and composition, most elastomeric membrane materials suitable for the use in tuneable liquid lenses suffer from effects based on solubility and swellability caused by the liquid filled in the volume.

The present invention aims to expand the spectrum of liquids which are suitable for use in tuneable lenses based on a liquid-elastomer technology using polydimethylsiloxane (PDMS) membranes and substituted PDMS. The liquids of the invention allow the use of PDMS and substituted PDMS in a broad spectrum of possible applications with different requirements applying the many positive properties, such as low-temperature flexibility, long-term stability under UV, heat and moisture stability and high transmission.

This objective is attained by the subject-matter of the independent claims of the present specification, with further advantageous embodiments described in the dependent claims, examples, figures and general description of this specification.

SUMMARY OF THE INVENTION

Liquids which are suitable for the use in optical devices, such as tuneable lenses have to meet certain criteria. A suitable molecule needs to contain a spectrum of properties where the chemical affinity to the membrane environment such as a PDMS matrix and the 3-dimensional structure and stability of the membrane are in balance. An important role plays a low solubility (typically less than 1.5% %) so the molecules of the liquid do not penetrate the surface nor bulk of the surrounding polymer network of the membrane so as to avoid extensive swelling of the membrane.

While in the ideal case no measurable swelling is observed in the targeted temperature range from −40° C. to +85° C. (the case for larger alkyl- and Nitril-functionalized Siloxanes), there are applications where up to 4% or eventually even more swelling is allowed (measured with Methyl-Phenyl-modified siloxanes) under the condition that the application does not see abrupt changes of the environmentally relevant conditions (such as temperature changes of more than about 20° C. per minute). Dissolution and diffusion should both be fully reversible. To monitor these processes, exact test conditions are of fundamental importance to allow a decision of the compatibility of the molecule with respect to a certain membrane.

The specific limit of swellability that may be tolerated is a case and application specific question. For example, liquids for lenses that will be used at high temperature or high-pressure conditions might be assessed differently compared to liquids for lenses that will be used at low temperatures because the swellability and diffusivity is temperature dependent, i.e., the solubility of the liquid in the elastomer of the membrane increases with temperature and thus the swelling. A thermal shock on an elastomer such as PDMS can lead to a situation of oversaturation with the result that the liquid is pressed out of the polymer matrix, creating surface effects such as thin films and later nucleation and droplet formation on the surface. Nevertheless, in specific conditions a maximum of 5% swellability is tolerable.

Finally, the material pair of liquid and elastomer prove compatible for optical applications when its complete spectrum of properties do not allow the liquid molecule to penetrate into the polymer bulk—or when its complete spectrum of properties do not allow the molecule to penetrate through the polymer bulk and through the surface at the same time and as long as the polymer network is not affected in instable manner. This might be given if the affinity is high and stops the molecule from being released into another medium (gas or another fluid).

The present invention describes an optical tuneable device that comprises a volume filled with a liquid (compound of formula 1) that fulfils the criteria described above with regard to a PDMS membrane material.

A first aspect of the invention relates to an optical tuneable device comprising a volume and a membrane, wherein the membrane delimits the volume at least partially and the volume is filled with a liquid comprising at least one compound of formula 1,

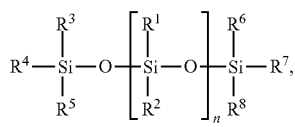
(1)

wherein
- each $R^1$ is independently from any other $R^1$ selected from $C_x$-alkyl-A, particularly each $R^1$ is selected from $C_x$-alkyl-A, with
  - A being selected from —H, CN, phenyl, —(CH$_2$)-phenyl and CF$_3$, in particular —H and —CN, and
  - x being an integer between 3 and 20,
- each $R^2$ is independently from any other $R^2$ selected from —H, $C_y$-alkyl, $C_y$-alkyl-B, phenyl, —(CH$_2$)-phenyl, in particular from any other $R^2$ selected from —H, $C_y$-alkyl, phenyl, —(CH$_2$)-phenyl, with
  - B being selected from CN, phenyl, —(CH$_2$)-phenyl and CF$_3$, in particular CF$_3$ and —CN
  - y being an integer between 1 and 17, particularly between 1 and 6,
- $R^3$, $R^4$, $R^5$, $R^6$, $R^7$ and $R^8$ are independently selected from —H, $C_{1-4}$-alkyl, phenyl, and —(CH$_2$)-phenyl, particularly methyl,
- n is an integer between 1 and 50,
- the sum of x and y is ≤21,
- $R^1$, $R^2$, $R^3$, $R^4$, $R^5$, $R^6$, $R^7$ and $R^8$ are optionally substituted by one or more substituents —F,
- and wherein
- the membrane is a polydimethylsiloxane (PDMS) or and substituted PDMS membrane, in particular an unsubstituted PDMS.

As described above, tuneable lenses based on a liquid-elastomer technology comprise a volume that is at least partially delimited by an elastic membrane which contacts the liquid filled in said volume. The focus of the tuneable lens can be adjusted by changing the curvature of the elastic membrane. Means for adjusting the curvature of the membrane are known to those of skill in the art. A non-limiting example for such device is shown in FIG. 1 and FIG. 2.

The volume is filled with a silicone-based polymer (compound of formula 1). The polymer comprises 1 to 50 monomers that are characterized by side chains $R^1$ and $R^2$.

A second aspect of the invention relates to the use of a compound of formula 1 as described in the first aspect of the invention in an optical tuneable device.

TERMS AND DEFINITIONS

For purposes of interpreting this specification, the following definitions will apply and whenever appropriate, terms used in the singular will also include the plural and vice versa. In the event that any definition set forth below conflicts with any document incorporated herein by reference, the definition set forth shall control.

The terms "comprising," "having," "containing," and "including," and other similar forms, and grammatical equivalents thereof, as used herein, are intended to be equivalent in meaning and to be open ended in that an item or items following any one of these words is not meant to be an exhaustive listing of such item or items, or meant to be limited to only the listed item or items. For example, an article "comprising" components A, B, and C can consist of (i.e., contain only) components A, B, and C, or can contain not only components A, B, and C but also one or more other components. As such, it is intended and understood that "comprises" and similar forms thereof, and grammatical equivalents thereof, include disclosure of embodiments of "consisting essentially of" or "consisting of."

Where a range of values is provided, it is understood that each intervening value, to the tenth of the unit of the lower limit, unless the context clearly dictate otherwise, between the upper and lower limit of that range and any other stated or intervening value in that stated range, is encompassed within the disclosure, subject to any specifically excluded limit in the stated range. Where the stated range includes one or both of the limits, ranges excluding either or both of those included limits are also included in the disclosure.

Reference to "about" a value or parameter herein includes (and describes) variations that are directed to that value or parameter per se. For example, description referring to "about X" includes description of "X."

As used herein, including in the appended claims, the singular forms "a," "or," and "the" include plural referents unless the context clearly dictates otherwise.

Unless defined otherwise, all technical and scientific terms used herein have the same meaning as commonly understood by one of ordinary skill in the art.

The term $C_x$-alkyl or $C_y$-alkyl in the context of the present specification relates to an alkyl moiety consisting of a certain number (x or y) of C atoms. The alkyl moiety may be linear or branched. For instance, n-butyl, 2-methylpropyl and tert-butyl are examples for x or y being 4.

The term PDMS relates to polydimethylsiloxane (CAS No. 63148-62-9).

The term substituted PDMS refers to at least partially functionalised PDMS by additional substituents such as phenyl or fluoride.

The term substituted in its broadest sense refers to an alkyl or phenyl that is substituted in one or several carbon atoms by fluoride F. Non-limiting examples include —CH$_2$F, —CHF$_2$, —CF$_3$, —(CH$_2$)$_2$F, —(CHF)$_2$H, —(CHF)$_2$F, —C$_2$F$_5$, —(CH$_2$)$_3$F, —(CHF)$_3$H, —(CHF)$_3$F, —C$_3$F$_7$, —(CH$_2$)$_4$F, —(CHF)$_4$H, —(CHF)$_4$F and —C$_4$F$_9$. A similar definition applies to a substituted alkyl that is substituted in one or several carbon atoms by with phenyl.

DETAILED DESCRIPTION OF THE INVENTION

A first aspect of the invention relates to an optical tuneable device comprising a volume and a membrane, wherein the membrane delimits the volume at least partially and the volume is filled with a liquid comprising at least one compound of formula 1,

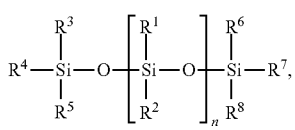
(1)

wherein
   each $R^1$ is independently from any other $R^1$ selected from $C_x$-alkyl-A, particularly each $R^1$ is selected from $C_x$-alkyl-A, with
      A being selected from —H, CN, —(CH$_2$)-phenyl, phenyl and CF$_3$, in particular —H and —CN, and
      x being an integer between 3 and 20,
   each $R^2$ is independently from any other $R^2$ selected from —H, $C_y$-alkyl, $C_y$-alkyl-B, phenyl, —(CH$_2$)-phenyl, in particular from any other $R^2$ selected from —H, $C_y$-alkyl, phenyl, —(CH$_2$)-phenyl, with
      B being selected from CN, phenyl, —(CH$_2$)-phenyl and CF$_3$, in particular CF$_3$ and —CN
      y being an integer between 1 and 17, particularly between 1 and 6,
   $R^3$, $R^4$, $R^5$, $R^6$, $R^7$ and $R^8$ are independently selected from —H, $C_{1-4}$-alkyl, phenyl, and —(CH$_2$)-phenyl, particularly methyl,
   n is an integer between 1 and 50,
   the sum of x and y is ≤21,
   $R^1$, $R^2$, $R^3$, $R^4$, $R^5$, $R^6$, $R^7$ and $R^8$ are optionally substituted by one or more substituents —F,
   and wherein
   the membrane is a polydimethylsiloxane (PDMS) membrane or a substituted PDMS, in particular unsubstituted PDMS.

The PDMS or the substituted PDMS is optical transparent.

The focus of the lens can be adjusted by changing the curvature of the membrane. This may for instance be achieved by using an actuator that presses a holding ring against the membrane, by means of a coil or by means of a ring-shaped piston that directly indents the membrane in order to deform it, or by using a wall that is designed to be adjustable in height with respect to the optical element.

A non-limiting example of a tuneable device that may be filled with a compound of formula 1 is shown in the Figures.

In certain embodiments, the PDMS or the substituted PDMS is purely elastic with low viscoelastic damping.

In certain embodiments, the PDMS can be at least partially functionalised by additional substituents such as phenyl or fluoride. The functionalisation can be chosen dependent on the applied liquid providing a particularly low solubility between the liquid and said PDMS.

n certain embodiments, the PDMS is unsubstituted PDMS.

In certain embodiments, the volume is filled with at least one compound of the formula 1 and comprises additives, in particularly additives to change the stability of materials such as inhibitors or absorbers.

In certain embodiments, the volume is filled with a mixture of two or more compounds of the formula 1. This allows the adjustment of the optical properties such as refractive index or density.

In certain embodiments, the volume is filled with a mixture of two or more compounds of the formula 1 and comprises additives, in particularly additives to change the stability of materials such as inhibitors or absorbers.

In certain embodiments, the volume is filled by at least 50% with the compound(s) of formula 1.

In certain embodiments, the optical tuneable device comprises a device that is designed to adjust the curvature of the membrane.

In certain embodiments, the optical tuneable device comprises an actuator to adjust the curvature of the membrane.

In certain embodiments, the optical tuneable device comprises a ring, a coil or a piston that is designed to adjust the curvature of the membrane or a wall that is designed to be adjustable in height to adjust the curvature of the membrane.

The volume is filled with a silicone-based polymer (compound of formula 1). The polymer comprises 1 to 50 monomers that are characterized by side chains $R^1$ and $R^2$.

The side chains contribute to steric hindrance which limits penetration and transport of the compound of formula 1 through the membrane structure.

The polymer may be composed of different monomers having varying moieties at $R^1$ and/or $R^2$. An example may be polymer that is composed of a mix of monomers having an alkyl at $R^1$ and monomers having an alkyl-CN moiety at $R^1$. Also, variation at $R^2$ is possible within one polymer. For instance, in a polymer characterized by $R^1$ being an alkyl-CN moiety, the $R^2$ moiety may vary between methyl and —CH2-phenyl.

The $C_x$- and $C_y$-alkyl moieties at $R^1$ and $R^2$, respectively, may be linear or branched alkyls.

In certain embodiments, each $R^1$ is identical to any other $R^1$.

In certain embodiments, each $R^2$ is identical to any other $R^2$.

In certain embodiments, each $R^1$ is identical to any other $R^1$ and each $R^2$ is identical to any other $R^2$.

The moieties $R^1$ to $R^8$ may optionally be fluorinated. Particularly the steric effect of the polymer may be adjusted by full or partial F substitution. Thus, penetration and transport of the polymer through the membrane structure may be avoided. This is particularly important when the sum of x and y is rather small, e.g. the alkyl moiety at $R^1$ is in the range of $C_{3-7}$-alkyl.

In certain embodiments, the F-substitution is in the range of more than 40%.

In certain embodiments, the moieties $R^3$, $R^4$, $R^5$, $R^6$, $R^7$ and $R^8$ are fully or partially, particularly fully substituted. This is particularly important when the sum of x and y is rather small, e.g. the alkyl moiety at $R^1$ is in the range of $C_{3-7}$-alkyl.

In embodiments with longer side chains at $R^1$ and $R^2$, the side chain is substituted, in particular with at least 40%.

In embodiments with longer side chains at $R^1$ and $R^2$, the side chain is substituted, in particular with at least 40%, and the moieties $R^3$, $R^4$, $R^5$, $R^6$, $R^7$ and $R^8$ are fully or partially, particularly fully substituted.

For application in an optical lens, the liquid (compound of formula 1) filled in the volume should be transparent.

In certain embodiments, the refractive index for the compound of formula 1 is between 1.33 and 1.6, particularly between 1.44 and 1.47.

The viscosity of the compound of formula 1 correlates with the number n. Polymers consisting of many monomers are more viscous than polymers consisting of less monomers. The viscosity of the polymer affects how fast the focus of the optical tuneable device can be adjusted. For most applications, a viscosity equal to or below 100000 cSt is suitable.

In certain embodiments, the viscosity of the compound of formula 1 is 100000 cSt, particularly 5-2000 cSt.

If A is —CN, the compound of formula 1 is polar. A polar structure has low solubility in a non-polar environment and accordingly, when PDMS is used as elastic membrane element, the use of a polar liquid is suitable under the condition that the presence of water is controlled, for instance in a closed system.

In certain embodiments, x is an integer between 3 and 13 in case of A being —CN.

In certain embodiments, x is an integer between 3 and 6 in case of A being —CN.

In case of polar compounds of formula 1, the refractive index can be adjusted without significantly affecting swelling or other properties for application in optical devices by punctual substitution of the —CN moiety by other non-reactive moieties such as alkyls, trifluoroalkyls and phenyls, particularly phenyl, —($CH_2$)-phenyl and $CF_3$ more particularly $CF_3$. The fraction of those substitutes might be in the range of up to 50% to overall maintain the properties of the —CN moieties and maintain compatibility to elastomers such as PDMS.

In certain embodiments, A is —CN in at least 50% of all $R^1$ in case of n≥2.

In certain embodiments, A is —CN for all $R^1$.

If A is —H, the compound of formula 1 is hydrophobic. Hydrophobic properties of the liquid are a preferred for its use in open systems where water can diffuse in and out.

In certain embodiments, A is —H for all $R^1$.

In certain embodiments, x is an integer between 6 and 20, particularly between 9 and 20 in case of A being —H.

In case of hydrophobic compounds of formula 1, $C_{6-13}$, particularly $C_{9-13}$-alkyls may be used at $R^1$ to maintain a well-balanced set of properties. For a compound comprising short side chains at $R^1$ (e.g., x=9), both, the viscosity and melting point are rather low but interesting for many applications, while the swelling of a membrane made of PDMS at higher temperatures around 85° C. is getting relevant. On the other side, compounds comprising a rather large alkyl group at $R^1$ (x=12 or 13), have a higher melting point, typically above 10 to 15° C., where its use can get limited. Nonetheless, compounds comprising a shorter or a longer alkyl chain are suitable for most standard applications.

In certain embodiments, x is an integer between 6 and 13, particularly between 9 and 13 in case of A being —H.

In certain embodiments, x is an integer between 9 and 12 in case of A being —H.

Also, in case of hydrophobic compounds of formula 1, the refractive index can be adjusted by partial substitution of $R^1$ and/or $R^2$. For instance, a methyl group at $R^2$ may be exchanged in some monomers by a phenyl or —($CH_2$)-phenyl moiety.

In certain embodiments, the $C_x$-alkyl of the moiety $C_x$-alkyl-A is linear.

In certain embodiments, the $C_x$-alkyl of the moiety $C_x$-alkyl-A and the $C_y$-alkyl is linear.

Typically, the n number is in the range of 1 to 50. Within this range, basic compatibility and neglectable swelling of the elastic membrane material is achieved. Of note, the viscosity increases with increasing number of monomers n. For most applications, a low viscosity is preferred since it leads to a higher tuning speed of the adaptive element—especially at lower temperatures. Nevertheless, a high viscosity can be preferred when the dynamics of the optical is of less importance, but the robustness towards mechanical shocks, low vapour pressures, robustness against cavitation (with induced bubble formation) or comparable are preferred. A reasonable viscosity limit is 100000 cSt. Low n numbers, such as 1 to 5, may induce certain risks of vapour creation at low pressures inside of the optical device, combined with high temperatures and mechanical shocks; especially after rapid transfer from cold environment in a high-pressure gas atmosphere. Nevertheless, at low or very low temperatures, such low molecular weight type of liquids may be preferred. These extreme conditions (high/low temperatures; high/low pressures) are likely to be found in space applications, where tuneable optical devices such as focus tuneable lenses can significantly reduce the weight of optical systems.

In certain embodiments, n is an integer between 1 and 5.

For applications, e.g., in camera system, at ambient temperature (e.g., 15° C. to 40° C., preferably −20° C. to 85° C.), polymers consisting of 11 to 29 monomers are particularly suitable.

In certain embodiments, n is an integer between 11 and 29.

For optical tuneable devices specifically used at high temperatures (e.g., 40° to 150° C.), the Standard Temperature and Pressure (STP) viscosity of the polymer should be high.

In certain embodiments, n is an integer between 30 and 50.

Suitable membranes are optically transparent, have low viscoelastic damping and show chemical and physical stability (including stable elasticity) over a very broad temperature range, i.e. at least from minus 40° C. to 200° C.

In certain embodiments, the membrane is transparent and stable at a temperature between −40° C. and +200° C.

Another aspect of the invention relates to the use of a compound of formula 1 as described in the first aspect of the invention in an optical tuneable device.

Reference is made to the embodiments of the first aspect of the invention, particularly to the embodiments relating to the optical tuneable device and relating to the compound of formula 1.

REFERENCES NUMBERS

Figure 1:
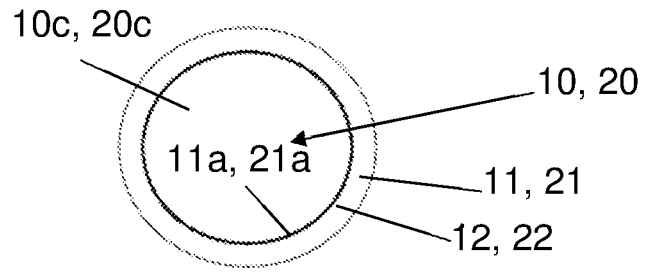
FIG. 1 shows a plan view of a first membrane attached to a first holding member.

1 Lens
10 Membrane
10b inner side of the membrane 10
10c Optically active and elastically expandable region of the membrane 10
11 Circular holding member
11a Circumferential inner edge of the holding member 11
12 Outermost edge of the membrane 10
20 Optical element
30 Circumferential first wall
31 Circumferential and partially flexible region
32 Crease
33 Circumferential edge region of the wall 30
34 First section of the wall 30
35 Opposing section of the wall 30

Figure 2:
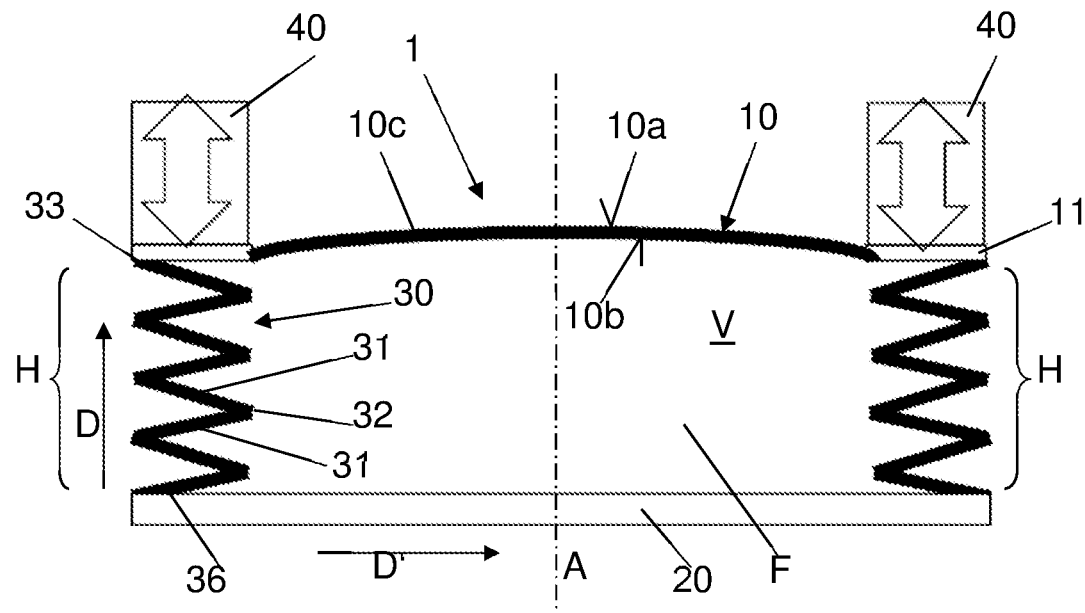
FIG. 2 shows cross sectional views of lens according to the invention having a first wall in the form of a bellows.
Figure 2:
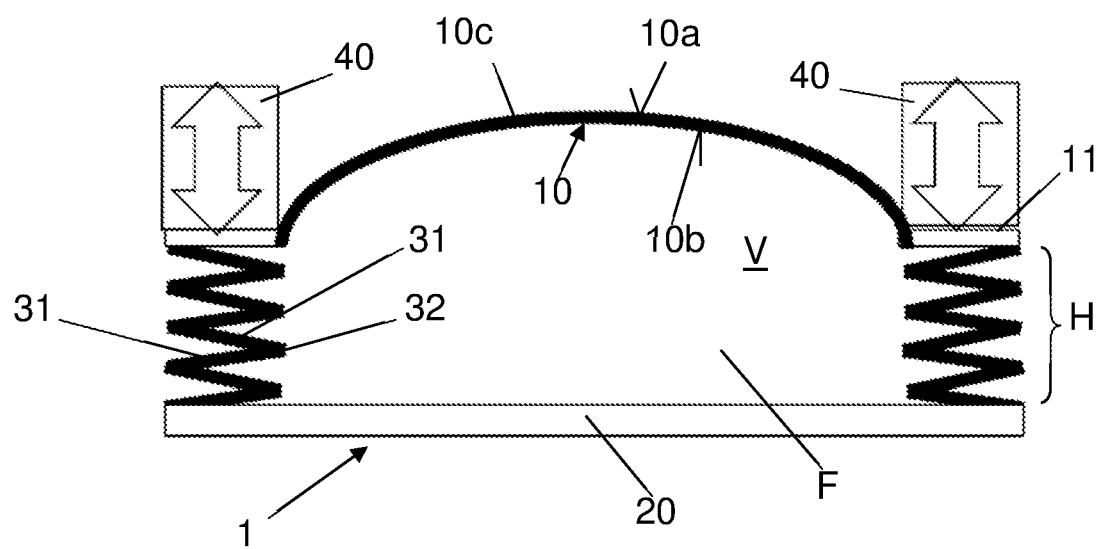
Figure 3:
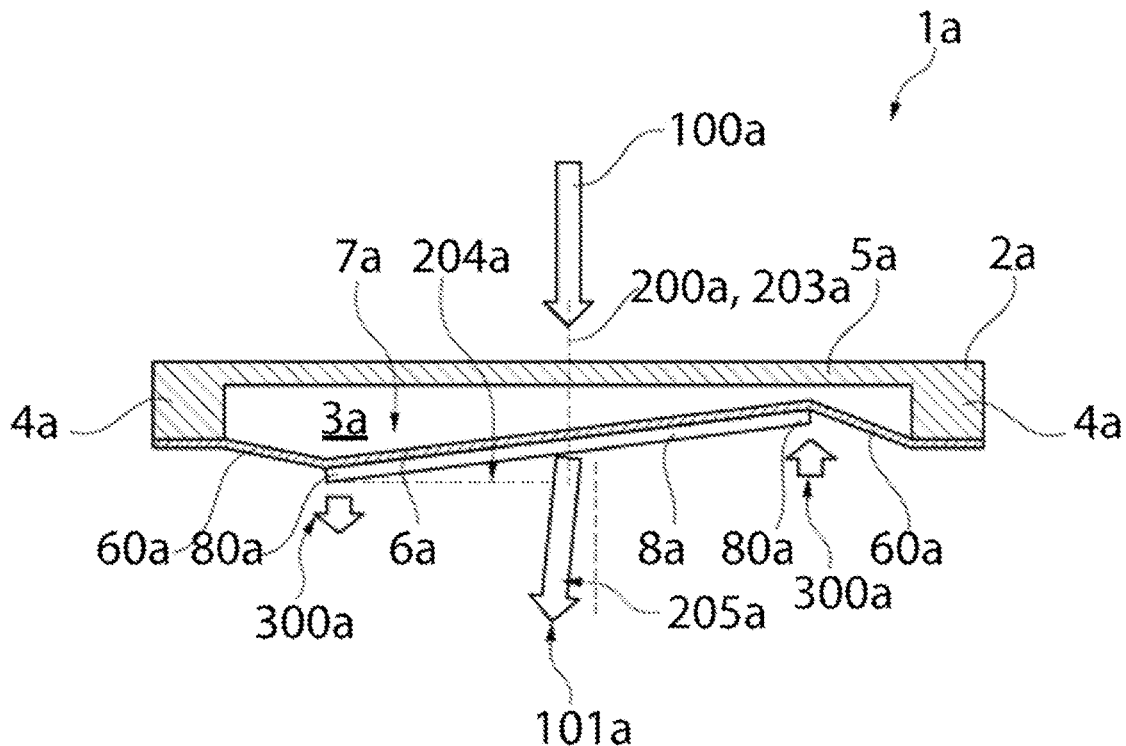
FIG. 3 shows a cross sectional view of a prism according to the invention having a second wall in the form of membrane.

36 Circumferential second lover edge region of the wall 30
40 Actuator means
A Optical axis
D direction
F fluid
H height
V volume
1a Prism
2a Container
3a Transparent optical fluid
4a Wall member
5a Planar bottom portion
6a Elastic membrane
60a Circumferential portion of the membrane 6a
60b Elastic membrane
7a Enclosed volume
8a Glass window
80a Outer edge of the window 8a
20a Elastically expandable membrane portion
30a Refractive index
100a Incident light
200a Optical axis
201a x-axis
202a y-axis
203a z-axis
204a Tilt angle
205a Deflection angle
300a actuation force FIG. 2 shows in conjunction with FIG. 1 an embodiment of a tunable lens 1 suitable for the present invention. The lens 1 comprises a transparent and elastically expandable first membrane 10 as shown in FIG. 1. The first membrane 10 can be made of a glass, a polymer, an elastomer, a plastic or any other transparent and elastically expandable material. The first membrane 10 is attached via an outermost edge region 12 of the first membrane 10 to a circular first holding member 11 such that the membrane 10 is preferably in a pretensioned state. The circular first holding member 11 actually delimits an optically active and elastically expandable circular region 10c of the first membrane 10 which region 10c extends up to a circumferential inner edge 11a of the first holding member 11. As an alternative, said region 10c may also have a rectangular shape in case a correspondingly shaped first holding member 11 is used as shown in FIG. 3. Such a first holding member 11 may comprise two separate parallel members or may be formed as a rectangular frame having to parallel legs shaping the lens.

This results in a cylindrical lens 1 instead of a spherical lens 1. However, any other shape of said region 10c is also possible by choosing the geometry of the first holding member 11 accordingly.

The lens 1 further comprises a first optical element 20 opposing the first membrane 10, wherein said first optical element 20 is an e.g., plate-like rigid element that extends along an extension plane being oriented perpendicular to an optical axis A of the lens 1. The first optical element 20 can be transparent. Particularly, the first optical element may be formed out of or comprises a glass, and can be formed as an (e.g., glass) window, a lens, a micro structured element with refractive, diffractive or reflective structures. The first optical element 20 can further be made of plastic, a polymer or a metal. It may further comprise a reflection or antireflection coating.

The first membrane 10 and the first optical element 20 face each other along said optical axis A, wherein these two components are connected to each other via a circumferential first wall 30, which is connected to said first holding member 11 via a first upper circumferential edge region 33 of the first wall 30, and which is connected to the first optical element 20 via a circumferential second lower edge region 36 of the first wall 30, which second edge region 36 opposes the first edge region 33. Thus, the first wall 30 protrudes from the first optical element 20 along a first direction D which may run parallel to the optical axis A towards the first holding member 11.

The first membrane 10, the first optical element 20, and said first wall 30 are connected such that they delimit a first volume V of the lens 1 which is filled with a first fluid F such that said first fluid F fills the first volume V completely and particularly presses against an inner side 10b of the first membrane 10 facing the first optical element 20.

Now, in order to adjust a curvature of the membrane 10, e.g., of said region 10c, for adjusting the focal length of the lens 1 and/or so as to adjust the spatial position of the first membrane 10 with respect to the first optical element 20, the first wall 30 is designed to be adjustable in height H along said first direction D with respect to said first optical element 20, so as to adjust the pressure of the first fluid F residing inside the first volume V. Here, the height H of the first wall 30 may be adjusted such that the pressure of the first fluid F changes which leads to a corresponding change of the curvature of the first membrane 10 of the lens 1 due to the constant volume of the fluid F.

Specifically, when said height H of the first wall 30 is decreased overall, which would correspond to a reduction of the volume V of the lens 1, the first fluid F presses due to its incompressibility against the elastically deformable region 10c of the first membrane 10, thus increasing the curvature of this region 10c. At the same time said region 10c of the first membrane 10 expands elastically.

Further, when said height H is increased overall, the pressure of the first fluid F decreases causing said region 10c of the first membrane 10 to contract and said curvature of said region 10c of the first membrane 10 to decrease.

However, the height H of the first wall 30 may also be changed asymmetrically with respect to axis A in a way that the pressure of the fluid F remains constant or is the same after adjusting the height H. Then, merely the spatial position of said first membrane 10 or said region 10c of the first membrane 10 is changed. However, an asymmetrical height adjustment may also lead to an altered pressure of the first fluid F and a corresponding change in curvature of said region 10c of the first membrane 10.

Specifically, the height H1 of a first section 34 of the first wall 30 may be higher than the height H2 of an opposing section 35 of the first wall 30 leading to a tilted orientation of said region 10c of the first membrane 10 with respect to said optical axis A or the first optical element 20.

Preferably, the first wall 30 as indicated in FIG. 2 comprises a bellows or is formed as a bellows. Such a bellows 30 comprises a plurality of e.g., circumferential and particularly flexible regions 31, wherein particularly each two adjacent regions 31 are connected to each other via an (e.g., circumferential) crease 32, such that when said height H of the first wall 30 is decreased said adjacent regions 31 are folded towards each other and when said height H of the first wall 30 is increased said adjacent regions 31 are folded away from each other. Thus, concerning its cross section, the first wall or bellows 30 preferably comprises a zig-zag pattern. The creases 32 of the bellows 30 may be reinforced by means of rigid elongated members that may follow the course of an associated crease 32.

Preferably, said creases 32 extend along or parallel to the extension plane of the first optical element 20 (i.e., in a peripheral direction of the first wall/bellows 30) or perpendicular to said first direction D.

Due to the bellows structure, the first wall 30 deforms easier in said first direction D along which the first wall 30 comprises said adjustable height H than in a second direction D' running perpendicular to said first direction D.

In order to adjust the height H of the first wall 30 either locally or in an overall fashion, the lens 1 comprises an actuator means 40 which is coupled to the first wall 30 so as to adjust its height H along said direction D.

Preferably, said actuator means 40 is designed to exert a force on the first wall 30 so as to adjust the height H of the first wall 30, wherein particularly said actuator means 40 is coupled to said first holding member 11, so that the point of application of said force lies outside said region 10c of the first membrane 10. Thus, when the actuator means pushes on the first holding member 11 counter to the first direction D said regions 32 of the bellows 30 approach each other and the height of the first wall 30 decreases. On the other hand, when the actuator means 40 moves the first holding member 11 in the first direction D away from the first optical element 20, the regions 31 of the bellows 30 are folded/pivoted away from their respective adjacent regions 31 and the height H of the first wall 30 increases correspondingly. Particularly, the actuator means 40 may be connected to the first optical element 20 so as to be able to move the first holding member 11 with respect to the first optical element 20.

Particularly, said actuator means 40 does not push a structure against said region 10c of the first membrane 10. Therefore, the whole region 10c of the first membrane 10 can in principle be used for influencing a light path which allows one to increase the ration between the clear aperture and the outer diameter of the lens 1.

Further, the first wall 30, e.g., in the form of a bellows 30, may be also adjustable in a lateral direction (i.e., the second direction D'). Such a shearing movement of the first wall 30 may be used for the purpose of image stabilization, i.e., in order to compensate for a movement of the lens 1 in a plane running perpendicular to the optical axis A. Here, the actuator means 40 is also preferably coupled to the first holding member 11 and designed to displace said first holding member 11 along said second direction D'.

FIG. 3 shows a schematic cross-sectional view of the tuneable prism. FIG. 3 shows a basic embodiment of a tuneable prism 1a is shown in a cross-sectional view and the basic working principle is demonstrated. The tuneable prism 1 a comprises a container 2a filled with a transparent optical fluid 3a. The container 2a has a planar bottom portion 5a consisting of glass. The bottom portion 10a is arranged such that it faces towards the side of incident light 100a. Furthermore, a wall member 4a delimits the container 2a laterally with respect to the optical axis 200a. The wall member 4a is integrally formed with the bottom portion 5a. The optical axis 200a (broken lines) of the tuneable prism 1 extends orthogonally and centrally through the bottom portion 5a along the z-axis 203a.

The container 2a furthermore comprises an elastic membrane 6a arranged opposite the bottom portion 5a of the container 2a. The elastic membrane 6a is repeatedly elastically expandable and stretchable. In its resting state, the elastic membrane 6a extends under lateral tension parallel to the bottom portion 5a. This tension provides a restoring force to the membrane 6 to return in its resting state, when no actuation force is applied.

The membrane 6a is sealed to the wall member 4a of the container 2a at its edges such that the fluid 3a cannot escape the volume 7a enclosed by the wall member 6a, the bottom portion 5a and the membrane 6a.

On top of the membrane 6a facing away from the volume 7a, a glass window 8a is attached to the membrane 6a. In the resting state of the membrane 6a, the glass window 8a is extends parallel to the bottom portion 5a.

Between an outer edge 80a of the glass window 8a and the wall member 4a a circumferential portion 60a of the membrane 6a is not covered by the glass window 8a. This portion is referred to as the elastically expandable portion 60a.

In the resting state, incident light 100a traverses the tuneable prism 1a from the bottom portion 5a through the volume 7a to the window 8a without being deflected from the optical axis 200 as indicated by the arrows 100a, 101a.

When an actuation force 300a is applied to the outer edge 80a of the window 8a, the window 8a tilts around at least one axis, referred to as the first axis 201a, e.g., the x-axis. The window 8a can also be tilted around a second axis 202a, e.g., the y-axis that is particularly orthogonal to the first axis 201a and—like the first axis 201a—extends 10a within the plane of extension of the window 8a.

When the actuation force 300a is applied to the window 8a, the window 8a experiences a tilting motion around the first and/or second axis 201a, 202a.

In the tilted state, the window 8a is not extending parallel to the bottom portion 5a but encloses a tilt angle 204a with the bottom portion 5a and the optical axis 200a; a first section of the outer edge 80a of the glass window 8a is closer to the bottom portion 5a, while another section of the outer edge 80a located opposite the first section is located further away from the bottom portion 5a.

The elastically expandable membrane portion 60a around the outer edge 80a of the window 8a is stretched correspondingly. As the membrane 6a is elastic, particularly the 20a elastically expandable membrane portion 60a conveys a restoring force to the tilted window 8a.

In the tilted state of the tuneable prism 1a, traversing light 100, 101 exits the prism 1a at an angle 205 with respect to the optical axis 200. This is indicated by the arrows 100, 101 pointing into and outwards the tuneable prism 1a.

By adjusting the actuation force 300a on the window 8a, the tilt angle 204a of the window 8a can be adjusted, which translates to an adjusted deflection angle 205a of the exiting light 101a.

The relationship between the mechanical tilt angle 204a of the window 8a and the resulting deflection angle 205a of the light depends on the refractive index of the 30a optical fluid 3a, particularly the liquid. The higher the refractive index of the liquid 3a, the stronger the resulting light deflection.

On the other hand, a low-refractive index liquid usually exhibits less dispersion than a high-refractive index liquid. Therefore, when chromatic aberrations should be avoided, a low-refractive index liquid can be used. Thus, particularly in polychromatic applications like imaging, a low-refractive index liquid is suitable. The refractive index of a low-refractive index liquid is for example around 1.33.

A high-refractive index liquid in turn is suitable for monochromatic applications such as iris detection. The refractive index of a high-refractive index liquid is for example around 1.56.

Figure 4:
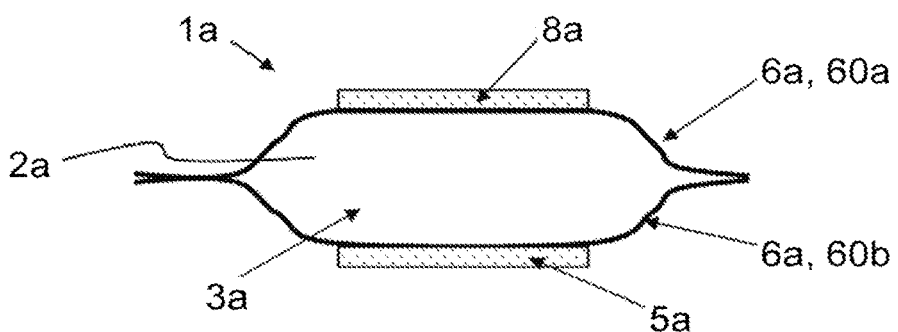
FIG. 4 shows a cross sectional view of a simplest prism according to the invention having two walls in form of membranes.

In FIG. 4 an embodiment of the tuneable prism 1a is shown that comprises a minimum number of components and that is particularly well suited for cost efficient production. The container 2a consists of only the transparent bottom portion 5a, the glass window 8a and two deformable, particularly elastic membranes 6a, 60a, 60b that are sealed with each other in order to form the closed container volume comprising the liquid 3a. This embodiment forms a bellows. Such a double-membrane bellows-container 2a further minimizes the required actuation force for tilting the window 8a around the first or second axis and on the other hand maximizes the ratio between clear aperture 90a and outer diameter of the window 8a.

Any previously introduced actuation concept (VCM with air-coils or embedded PCB-coils, SMA, Reluctance motor) and prism-shaping device type can be applied.

Figure 5:
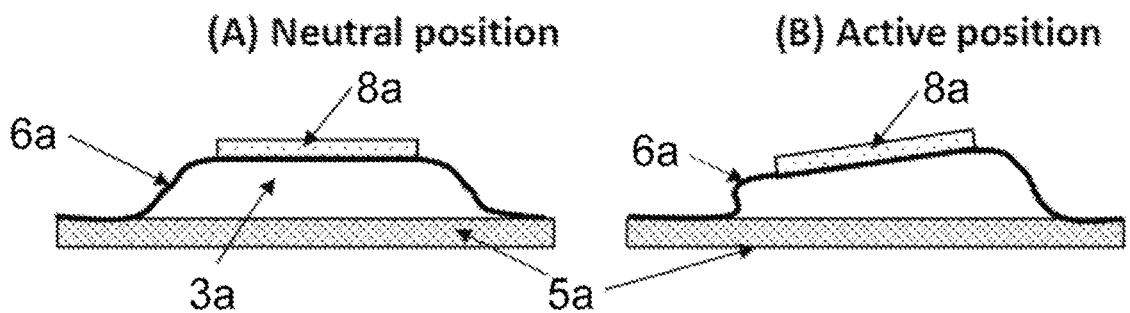
FIG. 5 shows a cross sectional view of a tunable prism according to the invention having a first wall in the form of a membrane in a neutral (A) and active position (B)

In FIG. 5 another embodiment of the tuneable prism 1a is shown. This embodiment comprises only one membrane 6a that is sealed to the bottom portion 5a. The edges of the bottom portion 5a, where the membrane 6a is sealed to, can also be understood as wall members 4a.

In the left panel of FIG. 5 the neutral position (light passes through the prism 1a without being deflected) with a non-tilted window 8a is shown, wherein on the right panel of FIG. 5 the window 8a is tilted with respect to the bottom portion 5a, such that light is deflected when passing through the prism 1a.

The container 2a comprises the liquid 3a. The membrane 6a is deformable but not necessary elastic.

The container 2a acts like a bellows when the prism-shaping device is actuated (not shown).

Such a bellows-container 2a would require less actuation force and maximize the ratio between clear aperture 90a and outer diameter because the membrane 6a is mainly 10a deformed in axial direction, i.e., parallel to the optical axis and not in radial direction.

EXAMPLES

| Chemistry | Molecular weight | n (number of repetitive units) | viscosity range [cSt] | swelling of PDMS | visual observed penetration upon 85° C. heat exposure |
| --- | --- | --- | --- | --- | --- |
| Poly (dimethylsiloxane) | 5000-ca 15000 | ca. 50-200 | 100-500 | >10% | Yes (liquid films) |
| Poly (octylmethylsiloxane) | N/A | ca. 20-30 | 600-1000 | <1% | no |
| Poly (trifluoropropylmethylsiloxane) | 3000-4600 | 20-30 | 500-1000 | <1% | no |
| Poly (tetradecylmethylsiloxane) | N/A | ca. 20-30 | 1500-2000 | <1% | no |
| Poly (cyanopropylmethylsiloxane) | N/A | ca. 20-30 | 800-1400 | <1% | no |

The visual observed penetration is assessed under the following conditions. The liquid material is arranged in a volume, wherein the volume is delimited on one side by a membrane. The membrane comprises a PDMS (e.g., Sylgard 184). The Setup is exposed to a thermal shock (delta T around −20° C./min) for T0=85° C.) at normal pressure. The visual observed penetration is assessed by identifying droplets or a film of the liquid material on top of the membrane on a side opposed to the volume.

We claim:

1. An optical tuneable device comprising a volume and a membrane, wherein the membrane delimits the volume at least partially and the volume is filled with a liquid comprising at least one compound of formula 1,

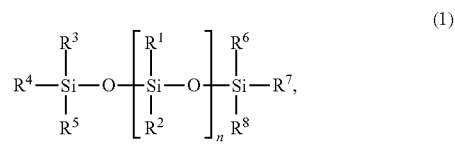

wherein
each $R^1$ is independently from any other $R^1$ selected from $C_x$-alkyl-A, particularly
each $R^1$ is selected from $C_x$-alkyl-A, with
   A being selected from —H, —CN, phenyl, —($CH_2$)-phenyl and —$CF_3$, and
   x being an integer between 3 and 20,
each $R^2$ is independently from any other $R^2$ selected from $C_y$-alkyl, $C_y$-alkyl-B, phenyl, —($CH_2$)-phenyl, in particular from any other $R^2$ selected from —H, $C_y$-alkyl, phenyl, —($CH_2$)-phenyl, with
   B being selected from —CN, phenyl, —($CH_2$)-phenyl and —$CF_3$, in particular —$CF_3$ and —CN
   y being an integer between 1 and 17
$R^3$, $R^4$, $R^5$, $R^6$, $R^7$ and $R^8$ are independently selected from —H, $C_{1-4}$-alkyl, phenyl, and —($CH_2$)-phenyl,
n is an integer between 1 and 50,
the sum of x and y is ≤21,
and wherein
the membrane is a polydimethylsiloxane (PDMS) membrane or a substituted PDMS, in particular an unsubstituted PDMS.

2. The optical tuneable device according to claim 1, wherein the refractive index for the compound of formula 1 is between 1.33 and 1.6.

3. The optical tuneable device according to claim 1, wherein the viscosity of the compound of formula 1 is ≤100000 cSt.

4. The optical tuneable device according to claim 1, wherein in case of A being —CN, x is an integer between 3 and 13.

5. The optical tuneable device according to claim 1, wherein in case of n≥2, A is —CN in at least 50% of all $R^1$.

6. The optical tuneable device according to claim 1, wherein A is —CN for all $R^1$.

7. The optical tuneable device according to claim 1, wherein A is —H for all $R^1$.

8. The optical tuneable device according to claim 1, wherein in case of A being —H, x is an integer between 6 and 20.

9. The optical tuneable device according to claim 1, wherein the $C_x$-alkyl of the moiety $C_x$-alkyl-A is linear.

10. The optical tuneable device according to claim 1, wherein n is an integer between 1 and 10.

11. The optical tuneable device according to claim 1, wherein n is an integer between 11 and 29.

12. The optical tuneable device according to claim 1, wherein n is an integer between 30 and 50.

13. The optical tuneable device according to claim 1, wherein the membrane is transparent and stable at a temperature between −40° C. and +200° C.

14. Use of a compound of formula 1 as described in claim 1 in an optical tuneable device.

15. The optical tuneable device according to claim 1, wherein y being an integer between 1 and 6.

16. The optical tuneable device according to claim 1, wherein $R^3$, $R^4$, $R^5$, $R^6$, $R^7$ and $R^8$ are methyl.

17. The optical tuneable device according to claim 1, wherein $R^1$, $R^2$, $R^3$, $R^4$, $R^5$, $R^6$, $R^7$ and $R^8$ are optionally substituted by one or more substituents —F.

\* \* \* \* \*